(12) United States Patent
Pawar et al.

(10) Patent No.: US 9,047,309 B1
(45) Date of Patent: Jun. 2, 2015

(54) DYNAMIC SNAPSHOT MOUNTING

(71) Applicant: EMC Corporation, Hopkinton, MA (US)

(72) Inventors: Sitaram Pawar, Shrewsbury, MA (US); Jean-Pierre Bono, Westborough, MA (US); Kumari Bijayalaxmi Nanda, Woodbridge, NJ (US)

(73) Assignee: EMC Corporation, Hopkinton, MA (US)

( * ) Notice: Subject to any disclaimer, the term of this patent is extended or adjusted under 35 U.S.C. 154(b) by 250 days.

(21) Appl. No.: 13/732,119

(22) Filed: Dec. 31, 2012

(51) Int. Cl.
*G06F 7/00* (2006.01)
*G06F 17/30* (2006.01)

(52) U.S. Cl.
CPC ............... *G06F 17/30197* (2013.01)

(58) Field of Classification Search
CPC .................................................. G06F 2201/84
USPC .......................................................... 707/739
See application file for complete search history.

(56) References Cited

U.S. PATENT DOCUMENTS

| | | | |
|---|---|---|---|
| 7,555,504 B2 | 6/2009 | Bixby et al. | |
| 7,631,155 B1 | 12/2009 | Bono et al. | |
| 8,032,498 B1 | 10/2011 | Armangau et al. | |
| 8,285,758 B1 | 10/2012 | Bono et al. | |
| 8,312,231 B1 * | 11/2012 | Li et al. | 711/154 |
| 8,433,869 B1 | 4/2013 | Natanzon et al. | |
| 2007/0198605 A1 * | 8/2007 | Saika | 707/202 |
| 2007/0250663 A1 * | 10/2007 | Welsh et al. | 711/117 |
| 2011/0282841 A1 * | 11/2011 | Saika et al. | 707/649 |
| 2012/0284233 A1 * | 11/2012 | Otani | 707/649 |
| 2014/0108351 A1 * | 4/2014 | Nallathambi et al. | 707/639 |

OTHER PUBLICATIONS

Zhao, et al., Pending U.S. Appl. No. 13/530,503, filed Jun. 2, 2012, Handling Copy on First Write Data for Snapshot Purposes.
Xie, et al., Pending U.S. Appl. No. 13/630,010, filed Sep. 28, 2012, Efficient Extent-Based B-Tree Insertion.

* cited by examiner

*Primary Examiner* — Binh V Ho
(74) *Attorney, Agent, or Firm* — BainwoodHuang (57) ABSTRACT

Techniques are presented for keeping only the most commonly-accessed snapshots mounted at any given time, while providing for fast mounting of unmounted snapshots. Techniques are also provided for maintaining separate databases for the snapshots of each primary filesystem in order to minimize locking latency.

14 Claims, 6 Drawing Sheets

| 76 FSID | 78 Size | 80 Mount Point |
|---|---|---|
| A13B F93D 0001 0000 | 100 GB | /mnt/Vol-a |
| A13B F93D 0002 0000 | 37 GB | /mnt/Vol-b |
| . . . | | |
| A13B F93D 01F4 0000 | 200 GB | /mnt/Vol-n |

| 88 FSID | 90 Size | 92 Mount Point |
|---|---|---|
| A13B F93D 0001 0001 | 90 GB | /mnt/Vol-a/.ckpt/Snap-a |
| A13B F93D 0001 0002 | 90 GB | /mnt/Vol-a/.ckpt/Snap-b |
| . . . | | |
| A13B F93D 0001 0100 | 100 GB | /mnt/Vol-a/.ckpt/Snap-p |

94 / 96 / 98 — 62(a)

DYNAMIC SNAPSHOT MOUNTING

BACKGROUND

In a network attached storage (NAS) environment, a NAS server typically provides users file-based access to a large number of filesystems stored on the NAS server over a network. In some conventional systems, snapshots are periodically taken of each of the filesystems in order to provide data backup and historical reference. In some systems, each snapshot is a mounted secondary filesystem (compared to a non-snapshot primary filesystem), accessible to a user of the associated primary filesystem. Typically, only a small number (e.g., 10) of snapshots per associated primary filesystem are stored on the NAS server at any given time.

In addition, in a conventional system, the NAS server maintains a filesystem database, which stores entries for all primary filesystems and snapshots stored on the NAS server. Whenever a primary filesystem or snapshot is created, deleted, or expanded, the corresponding entry in the filesystem database is modified accordingly.

SUMMARY

The above-described approach may not be optimal. For example, in the conventional approach, all stored snapshots are mounted on the NAS server. However, as the number of snapshots maintained per associated primary filesystem increases for an increasingly large number of primary filesystems stored on the NAS server, the amount of metadata required to be kept in memory to keep all of the snapshots mounted may approach the total amount of system memory. For example, in an NAS server which stores 500 primary filesystems and 256 snapshots per primary filesystem, if the average amount of metadata per filesystem is 500 kilobytes (KB), merely mounting all the primary filesystems and all the snapshots would take up about 61.3 gigabytes (GB) of memory. Since a typical NAS server only has about 64 GB of system memory, then if paging is to avoided (which it usually is, in order to avoid a drastic drop in performance), only about 2.7 GB of system memory is left for the operating system and data caching combined, which may cause degraded performance if many users are attempting to access the system at once.

Furthermore, as the number of snapshots maintained per associated primary filesystem increases for an increasingly large number of primary filesystems stored on the NAS server, the number of entries in the filesystem database increases. This can be problematic, since, any time the filesystem database is modified, it must be locked. For example, in an NAS server which stores 500 primary filesystems and 256 snapshots per primary filesystem, a conventional filesystem database would store 128,500 entries. If, at any given time, even a mere 500 of those entries needed to be modified, a huge delay could be created as the filesystem database is repeatedly locked and unlocked 500 times.

Thus, it would be desirable to minimize the number of snpashots mounted in memory, while keeping typical access performance high. It would also be desirable to minimize latency in creating, deleting, or expanding filesystems. Thus, techniques are presented for keeping only the most commonly-accessed snapshots mounted at any given time, while providing for fast mounting of unmounted snapshots. Techniques are also provided for maintaining separate databases for the snapshots of each primary filesystem in order to minimize locking latency.

One embodiment is directed to a method of dynamically mounting and unmounting a set of snapshot file systems (SFSs) stored within a data storage system, each SFS of the set of SFSs associated with a corresponding primary file system (PFS) of a set of PFSs stored within the data storage system, each SFS representing a state of its corresponding PFS at a particular prior point in time. The method includes (A) mounting a strict subset of the set of SFSs on the data storage system, the strict subset of the set of SFSs having a number of elements not exceeding a maximum number of snapshots, (B) receiving a request to access an additional SFS not within the strict subset of the set of SFSs, (C) mounting the additional SFS on the data storage system, thereby adding the additional SFS to the strict subset of the set of SFSs, and (D) if mounting the additional SFS on the data storage system causes the number of elements of the strict subset of the set of SFSs to exceed the maximum number of snapshots, then, in response, unmounting another SFS of the strict subset of the set of SFSs from the data storage system, thereby removing the other SFS from the strict subset of the set of SFSs.

Also, in some embodiments, each PFS stores a local snapshot database (SDB), the SDB including one entry for each SFS associated with that PFS, each entry including a unique FSID including a header portion and a footer portion, the header portion uniquely identifying that PFS, the footer portion uniquely identifying that SFS, each entry also storing a size of that SFS and a mount point for that SFS. In these embodiments, the method further includes (E) receiving a command to modify a particular SFS having a particular FSID, (F) identifying which PFS the particular SFS is associated with by referencing the header portion of the particular FSID, (G) locking the SDB stored by the identified PFS, while refraining from locking the FSDB, (H) modifying the entry of the identified SDB having the particular FSID, and (I) after modifying the entry, unlocking the SDB.

Other embodiments are directed to a computerized apparatus and a computer program product.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

DETAILED DESCRIPTION

Embodiments of the invention are directed to techniques for keeping only the most commonly-accessed SFSs mounted at any given time, while providing for fast mounting of unmounted snapshots. Techniques are also provided for maintaining separate databases for the snapshots of each PFS in order to minimize locking latency.

Figure 1:
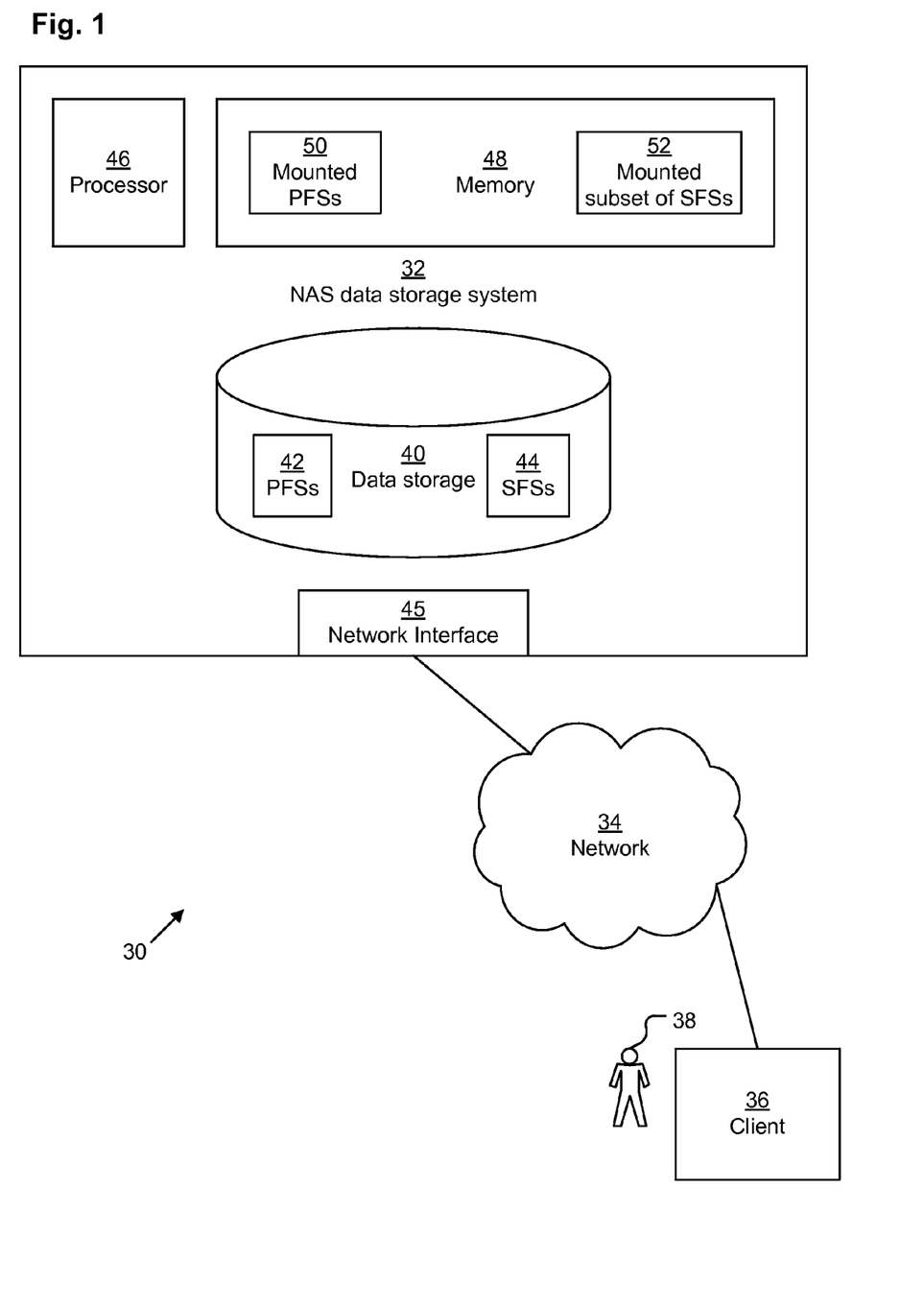
FIG. 1 is a block diagram depicting an example environment in which various embodiments may be practiced, including an example apparatus according to various embodiments.

FIG. 1 depicts an example system 30 for use in performing various embodiments. System 30 includes a NAS data storage system 32, which provides access to filesystems 42, 44 of data storage 40 to clients 36 over a network 34.

NAS data storage system 32 may be any kind of computing device, such as, for example, a personal computer, a workstation, a server, an enterprise server, a laptop computer, a mobile computer, a smart phone, a tablet computer, etc., but it will typically be a server or enterprise server, such as a VNX series or VNXe series data storage system provided by the EMC Corp. of Hopkinton, Mass.

Data storage 40 of the NAS data storage system 32 may take various forms, but it is typically formed from one or more persistent storage devices, such as hard disk drives and solid state storage devices (SSDs) connected either by an internal bus or via a network (e.g., a storage area network). Data storage 40 may be arranged in a fault tolerant arrangement, such as in a redundant array of independent disks, as is well-known in the art. Data storage 40 of the NAS data storage system 32 stores a set of PFSs 42 as well as a set of SFSs 44, each SFS 44 representing a snapshot of a PFS 42 at a particular point in time. Typically, each PFS 42 is associated with multiple SFSs 44. For example, each PFS 42 may be associated with 256 SFSs 44, representing 256 snapshots of that PFS 42 taken every 12 hours over the past 128 days. The sharing relationships between the PFSs 42 and SFSs 44 may be represented as detailed in U.S. Pat. No. 8,032,498, the contents and teachings of which are incorporated herein in their entirety by this reference.

In some embodiments, data storage system 32 stores a set of container filesystems (not depicted), each of which contains one PFS 42 and its associated SFSs 44. In some embodiments, each container filesystem is a file. In some embodiments, each PFS 42 and SFS 44 is a file.

NAS data storage system 32 also includes a network interface 45. NAS data storage system 32 is able to communicate with various clients 36 over network 34 using network interface 45. NAS data storage system 32 also contains a processor 46 and memory 48. Processor 46 may be any kind of processor or set of processors configured to perform operations, such as, for example, a microprocessor, a multi-core microprocessor, a digital signal processor, a collection of electronic circuits, or any combination of the above.

Memory 48 may be any kind of digital system memory, such as, for example, random access memory. In a typical embodiment, memory 48 may have a capacity of 64 GB, although more or less than this amount may instead be provided. Generally, an increased amount of memory 48 provides increased performance, but at a higher cost. Memory 48 stores a set of mounted PFSs 50, corresponding to the set of PFSs 42 stored on data storage 40, as well as a mounted subset 52 of the set of SFSs 44. Subset 52 is a strict subset of set 44, meaning that fewer than all SFSs 44 stored on data storage 40 are mounted in memory 48 at any given time.

Network 34 may be any kind of network or a combination of several different network. For example, network 34 may be a local area network, a wide area network, a storage area network, an Ethernet network, a Fibre Channel network, a set of point-to-point connections, or a fabric of interconnected connections, hubs, and switches. NAS data storage system 32 is configured to use file-based protocols, such as, for example, the Network File System (NFS), the Common Internet File System (CIFS), or the Multi Path File System (MPFS) to provide a user 38 of a client machine 36 with access to filesystems 42 and 44 stored in data storage 40 over network 34. Client machine 36 may be any kind of computing device, such as, for example, a personal computer, a workstation, a server, an enterprise server, a laptop computer, a mobile computer, a smart phone, a tablet computer, etc., but it will typically be a personal computer, a workstation, a laptop computer, a mobile computer, a smart phone, or a tablet computer.

Figure 2:
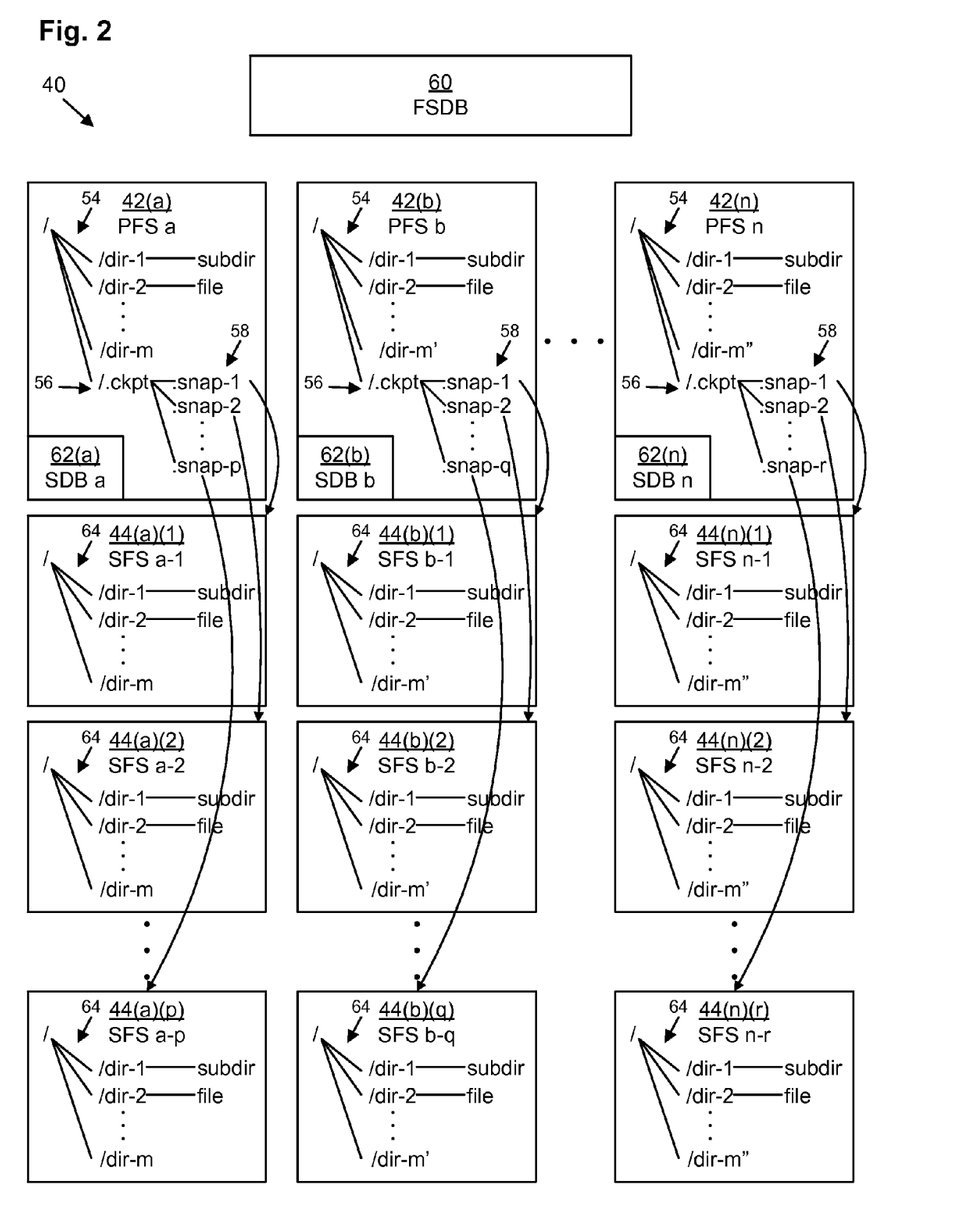
FIG. 2 is a block diagram depicting an example set of PFSs and SFSs of a data storage system.

FIG. 2 depicts example contents of data storage 40 and the logical connections between the various filesystems 42, 44 that it stores. Data storage 40 stores a filesystem database 60, which stores information about the various PFSs 42 stored on data storage 40. FSDB 60 is described in further detail below.

Data storage 40 stores n PFSs $42(a), 42(b), \ldots, 42(n)$. Each PFS $42(x)$ represents a filesystem structure 54, containing a root directory, various directories and subdirectories, and various files, as is well-known in the art. In some embodiments, each PFS $42(x)$ includes a checkpoint directory 56 (depicted as /.ckpt), which stores a set of links 58 to the various SFSs $44(x)$ associated with the snapshots of that PFS $42(x)$. Thus, for example, first PFS $42(a)$ includes p snapshot links 58, pointing to SFSs $44(a)(1)$-$44(a)(p)$, all of which are also stored on data storage 40. In other embodiments, instead of the checkpoint directory 56 being stored within filesystem structure 54 on data storage 40, the checkpoint directory 56 may be generated based on a similar checkpoint directory within the container filesystem that contains PFS $42(x)$, the checkpoint directory 56 being logically placed within filesystem structure 54.

Each SFS 44 also represents a filesystem structure 64, containing a root directory, various directories and subdirectories, and various files. Many of these directories, subdirectories, and files correspond to the directories, subdirectories, and files of the associated PFS 42, but, since directories, subdirectories, and files may be created and deleted over time, it is possible that they do not exactly correspond.

As depicted, first PFS $42(a)$ includes m directories and p links 58 to p SFSs $44(a)(1$-p) (it being understood that the links 58 may actually be stored within the corresponding container filesystem and only logically displayed within first PFS $42(a)$), while second PFS $42(b)$ includes m' directories and q links 58 to q SFSs $44(b)(1$-q) (it being understood that the links 58 may actually be stored within the corresponding container filesystem and only logically displayed within second PFS $42(b)$), and nth PFS $42(n)$ includes m" directories and r links 58 to r SFSs $44(n)(1$-r) (it being understood that the links 58 may actually be stored within the corresponding container filesystem and only logically displayed within nth PFS $42(n)$).

It should be understood that, although snapshots are typically made at even intervals, the numbers p, q, r of SFSs 44 stored for the various PFSs 42 may not be equal for various reasons. For example, the various PFSs 42 may have been created at various times, such that some of them have not yet had 256 (or whatever the potential number of snapshots stored for each PFS 42 is) snapshots taken. As an additional example, a user 38 who owns a particular PFS $42(x)$ may have decided to delete one or more of the snapshots associated with that PFS $42(x)$.

Each PFS $62(x)$ also stores a snapshot database (SDB) $62(x)$. The SDB $62(x)$ associated with each PFS $42(x)$ stores various information associated with all of the SFSs 44 stored on data storage 40 for that PFS $42(x)$. In some embodiments, instead of being stored within each PFS $42(x)$, SDB $62(x)$ is stored within the container filesystem that contains PFS $42(x)$. An example SDB 62 is described in further detail below.

Figure 3:
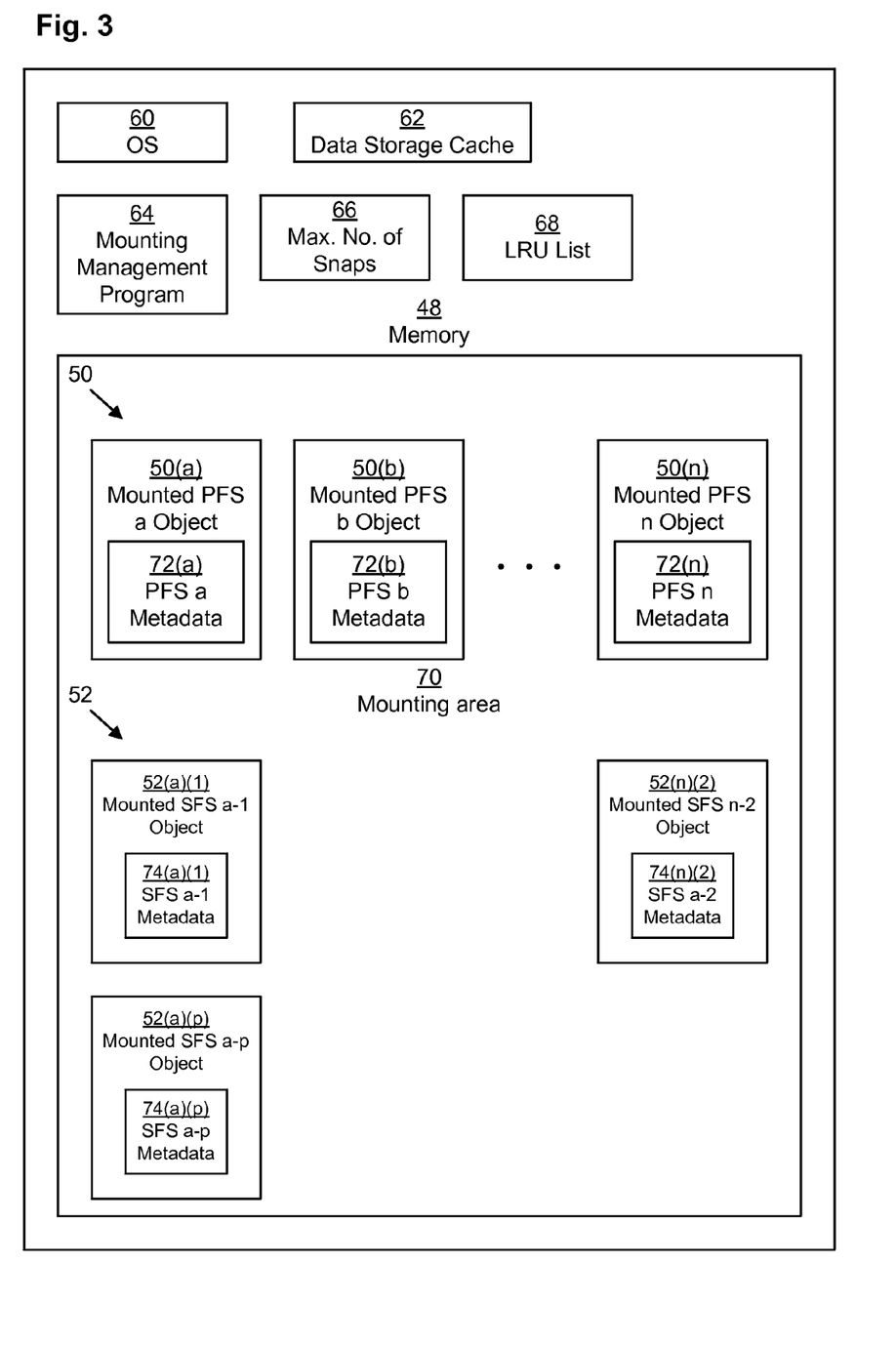
FIG. 3 is a block diagram depicting example contents of a computer memory according to various embodiments.

FIG. 3 depicts example contents of memory 48 in further detail. Memory 48 stores programs executing on processor 46 as well as data used by those programs. Memory 48 stores an operating system (OS) 60, and a mounting management program 64, both of which run on processor 46. Memory 48 may include both a system memory portion for storing programs and data in active use by the processor 46 as well as a persistent storage portion (e.g., solid-state storage and/or disk-based storage) for storing programs and data even while the NAS data storage system 32 is powered off. However, in some embodiments, persistent storage portion may be included within data storage 40. OS 60 and mounting management program 64 are typically stored both in system memory and in persistent storage so that they may be loaded into system memory from persistent storage upon a system restart. Mounting management program 64, when stored in non-transient form either in system memory or in persistent storage, forms a computer program product. The processor 46 running the mounting management program 64 thus forms a specialized circuit constructed and arranged to carry out the various processes described herein.

Memory 48 also stores a data storage cache 62, which is used to cache data from data storage 40 in the course of normal operation as a speed enhancement as is well-understood in the art. Data storage cache 62 may be configured to use the majority of the capacity of the system memory 48 for enhanced performance at high workloads.

Memory 48 also stores a variable 66 which defines the maximum number of snapshots to maintain in memory 48 in mounted form as mounted subset of SFSs 52. In some embodiments the maximum number of snapshots variable 66 is a pre-configured constant, such that, for example, the metadata for the maximum number of snapshots does not exceed 20% of the memory capacity. For example, if the memory capacity is 64 GB and the average metadata size per filesystem is 500 KB, then the maximum number of snapshots variable 66 would be pre-configured to be 26,843. In another embodiment, the maximum number of snapshots variable 66 is pre-configured to be 4,000. In another embodiment, the maximum number of snapshots variable 66 is a value that dynamically varies based on a data access load of the data storage system. For example, the maximum number of snapshots variable 66 might be 4,000 when the workload is high, but, in the middle of the night, when very few clients 36 are accessing the system and not much space is needed by the data storage cache 62, the maximum number of snapshots variable 66 may temporarily increase to 30,000.

Memory 48 also includes a mounting area 70. Mounting area 70 includes both mounted PFS objects 50 and mounted SFS objects 52. In some embodiments, mounting area 70 also includes mounted container filesystem objects (not depicted). A filesystem object is a data structure which is used to mount a filesystem. A PFS object 50 is a filesystem object which includes metadata 72 for a particular PFS 42 from data storage 40. Having the PFS metadata 72 stored in memory 48 when mounted allows the directory structure 54 of that PFS 42 to be browsed by a user 38, and it allows data operations on that PFS 42 to be quickly performed. Similarly, an SFS object 52 is a filesystem object which includes metadata 74 for a particular SFS 44 from data storage 40. Again, having the SFS metadata 72 stored in memory 48 when mounted allows the directory structure 64 of that SFS 44 to be browsed by a user 38, and it allows data operations on that SFS 44 to be quickly performed. At any given time, there are fewer mounted SFS objects 52 in mounting area 70 than there are SFSs 44 stored on data storage. Thus, for example, as depicted in FIG. 3, first PFS 42(*a*) (which is mounted in object 50(*a*)) has only two of its associated SFSs 44(*a*)(1) and 44(*a*)(*p*) mounted in mounting area 70 (in mounting objects 52(*a*)(1) and 52(*a*)(*p*)), while second PFS 42(*b*) (which is mounted in object 50(*b*)) has none of its associated SFSs 44(*b*) mounted, and third PFS 42(*n*) (which is mounted in object 50(*n*)) has only one of its associated SFSs 44(*n*)(2) mounted in mounting area 70 (in mounting object 52(*n*)(2)).

Memory 48 may also store a least-recently-used (LRU) list 68, which lists references to all mounted SFSs 52 in order from least-recently accessed to most-recently accessed).

Figure 4:
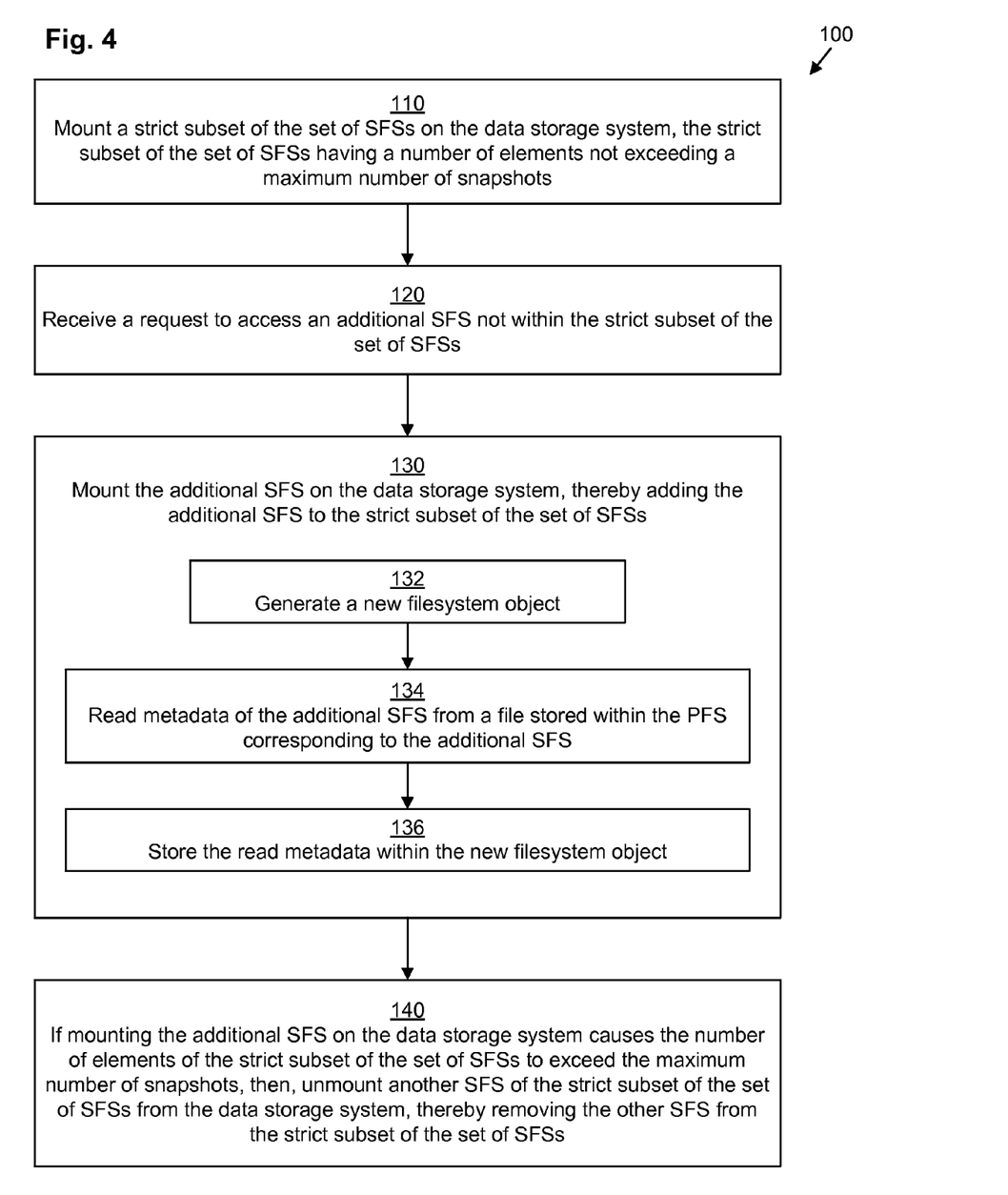
FIG. 4 is a flow chart depicting an example method according to various embodiments.

FIG. 4 illustrates the operation of system 30 in detail according to various embodiments. It should be understood that any time a piece of software, such as, for example, mounting management program 64, is described as performing a method, process, step, or function, what is meant is that the computing device (e.g., NAS data storage system 32) on which that piece of software is running performs the method, process, step, or function when executing that piece of software on its processor (e.g., processor 46). It should also be understood that, in some embodiments, instead of processor 46 executing code of mounting management program 64, specialized circuitry of the NAS data storage system 32 operates to perform the method, process, step, or function directly in hardware.

Figure 6:
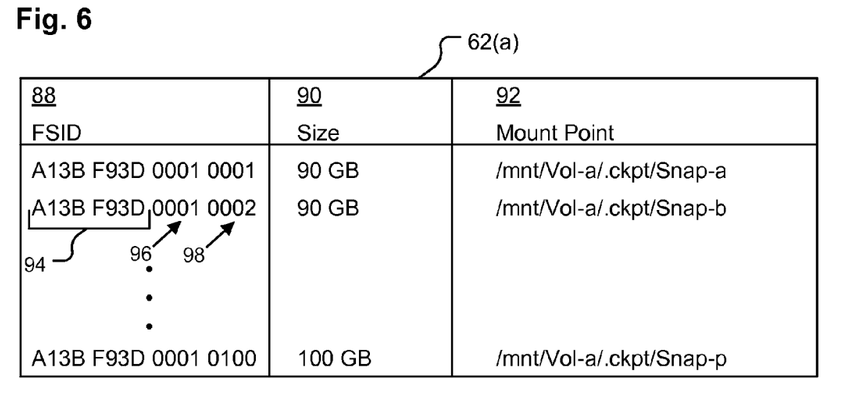

FIG. 6 illustrates, as method 100, the operation of mounting management program 64 on NAS data storage system 32. Preliminarily, in step 110, mounting management program 64 mounts a strict subset 52 of the set of SFSs 44 on the NAS data storage system 32 (e.g., by copying the appropriate metadata 74 into an appropriate filesystem object for each SFS 44 which is part of mounted subset 52). The strict subset 52 has no more elements than the value of the maximum number of snapshots variable 66 (e.g., the maximum number of snapshots variable is three, and, as depicted in FIG. 3, the strict subset 52 has three elements, 52(*a*)(1), 52(*a*)(*p*), and 52(*n*)(2)). Generally speaking, mounting management program 64 also mounts all PFSs 42 as mounted PFSs 50 and these all remain mounted as long as the NAS data storage system 32 continues to run, unless a user 38 directs that one or more of them be unmounted.

In step 120, mounting management program 64 receives a request to access an additional SFS 44 not within the strict subset 52 mounted in mounting area 70 (e.g., SFS 44(*b*)(1)). This may be accomplished by the user 38 navigating to the checkpoint directory 56 of the associated PFS 42 (e.g., PFS 42(*b*)), and the user 38 attempting to access the link 58 (e.g, .snap-1) to the particular additional SFS 44 not within the strict subset 52 mounted in mounting area 70 (e.g., SFS 44(*b*)(1)).

Since the particular additional SFS 44 (e.g., SFS 44(*b*)(1)) is not yet mounted, in step 130, mounting management program 64 mounts that additional SFS 44 (e.g., SFS 44(*b*)(1)) in mounting area 70, thereby, effectively adding that particular additional SFS 44 (e.g., SFS 44(*b*)(1)) to the strict subset 52 mounted in mounting area 70. This may be accomplished by performing sub-steps 132-136. In sub-step 132, mounting management program 64 generates a new, empty, filesystem object (e.g., as mounted SFS b−1 object 52(*b*)(1) (not depicted)). In sub-step 134, mounting management program 64 reads the metadata (e.g., 74(*b*)(1) (not depicted)) for the chosen additional SFS 44 from a hidden file within the associated PFS 42 (or in some embodiments, within the container filesystem associated with the PFS 42(*b*)). Because the associated PFS 42 is already mounted (e.g., PFS 42(*b*) is already mounted as mounted PFS 50(*b*)), this read operation is easily performed. In sub-step 136, mounting management program 64 stores the read metadata (e.g., 74(*b*)(1)) in the newlygenerated filesystem object (e.g., 52(b)(1)), thereby causing the chosen additional SFS 44 (e.g., SFS 44(b)(1)) to become mounted.

In step 140, if mounting the additional SFS 44 causes the number of elements in the strict subset 52 to exceed the value of the maximum number of snapshots variable 66, then mounting management program 64 unmounts another currently-mounted SFS 52(y), thereby removing that SFS 52(y) from the strict subset 52. For example, if by mounting SFS 44(b)(1) there are now four mounted SFSs 52, causing the number (4) of mounted SFSs 52 to exceed the value of the maximum number of snapshots variable 66 (e.g., 3), then, one of the mounted SFSs 52(y) (e.g., 52(a)(p)) is selected and unmounted. The selection of the particular mounted SFS 52(y) (e.g., 52(a)(p)) to unmounts may be done, by, for example, referencing LRU list 68 to determine which of the mounted SFSs 52 has been least-recently accessed.

Figure 5:
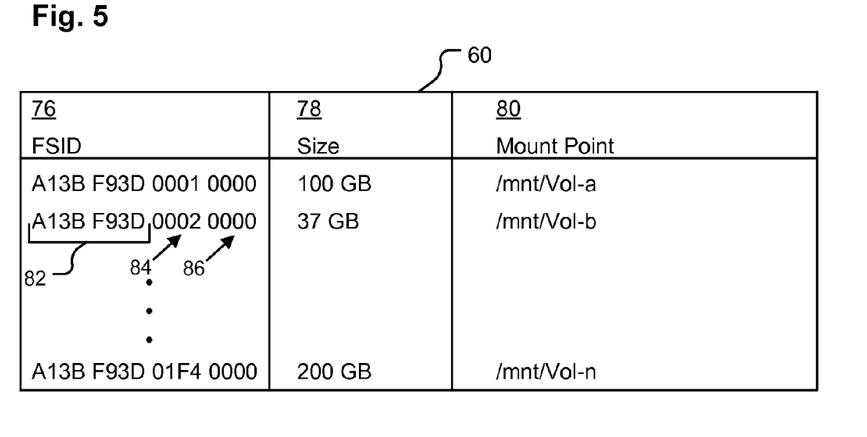
FIGS. 5 and 6 are block diagrams depicting example data structures for use in practicing various embodiments.

FIG. 5 depicts an example FSDB 60 in further detail. FSDB 60 has several columns. One column is FSID column 76. Other columns may include size column 78 and mount point column 80. Each entry of the FSDB 60 corresponds to one PFS 42 stored on data storage 40. The particular PFS 42(x) is identified by the FSID stored in the FSID column. Each FSID may be, for example, a 64-bit value arranged in three sections. A first section 82 includes various preliminary information, typically based on system characteristics, typically 32 bits in length. A second header section 84 serves to identify the particular PFS 42(x), while a third footer section 86 indicates that the FSID identifies a PFS 42 rather than an SFS 44. For example, the hexadecimal value 0000 in footer field 86 serves to indicate that the FSID represents a PFS 42, while any value other than 0000 would indicate an SFS 44. As depicted, header field 84 and footer field 86 are both 16 bits in length, although, in some embodiments, header field is only 15 bits in length, being preceded by a special control bit. Thus, the FSID can identify up to either 16,536 or 32,768 distinct PFSs 42. As depicted, the first entry in FSDB 60 identifies a PFS number 0001, corresponding to PFS 42(a), with a size of 100 GB, mounted at location /mnt/Vol-a. Similarly, the second entry in FSDB 60 identifies a PFS number 0002, corresponding to PFS 42(b), with a size of 37 GB, mounted at location /mnt/Vol-b, and the last entry in FSDB 60 identifies a PFS number 01F4 (equal to 500 in decimal), corresponding to PFS 42(n), with a size of 200 GB, mounted at location /mnt/Vol-n.

With reference to FIG. 5, certain modifications to a PFS 42 (including creation, deletion, expansion, and reduction) involve modifying FSDB 60. Modifying FSDB 60 involves temporarily locking the FSDB 60. However, since the FSDB 60 only has relatively few entries (e.g., only about as many as 500, corresponding to only the PFSs 42 on the data storage 40), this locking is relatively infrequent, as compared with conventional systems. Modifications to SFSs 44 do not involve locking the FSDB 60.

FIG. 6 depicts an example SDB 62(a) stored within PFS 42(a) (or, in some embodiments, within the container filesystem that contains PFS 42(x)) in further detail. SDB 62(a) has several columns. One column is FSID column 88. Other columns may include size column 90 and mount point column 92. Each entry of the SDB 62(a) corresponds to one SFS 44 stored on data storage 40 that corresponds to PFS 42(a) as a snapshot. The particular SFS 44(y) is identified by the FSID stored in the FSID column. Each FSID may be, for example, a 64-bit value arranged in three sections, similar to the FSIDs in FSDB 60. A first section 94 includes various preliminary information, typically based on system characteristics, typically 32 bits in length. A second header section 96 serves to identify the particular PFS 42(a), while a third footer section 98 identifies the particular SFS 44(y). For example, the hexadecimal value 0001 in footer field 98 serves to indicate that the FSID represents a first SFS 44(a)(1), associated with PFS 42(a) due to the value 0001 in header field 96. Since, as depicted, footer field 98 is 16 bits in length, the FSID can identify up to 32,767 distinct SFSs 44 for the PFS 42(a). Since, generally speaking, there are no more than 500 SFSs 44 for any PFS at any given time, newly-created snapshots are assigned to consecutive values up to 32,768 (hexadecimal FFFF), after which, the values wrap around back to 0001. Since old snapshots are deleted, upon wrapping around, the low values should be available. As depicted, the first entry in SDB 62(a) identifies an SFS 44 number 0001, corresponding to SFS 44(a)(1), with a size of 90 GB, mounted at location /mnt/Vol-a/.ckpt/Snap-a. Similarly, the second entry in SDB 62(a) identifies an SFS 44 number 0002, corresponding to SFS 44(a)(2), with a size of 90 GB, mounted at location /mnt/Vol-a/.ckpt/Snap-b, and the last entry in SDB 62(a) identifies an SFS 44 number 0100, corresponding to SFS 44(a)(p), with a size of 100 GB, mounted at location /mnt/Vol-a/.ckpt/Snap-p. Note that, it appears that PFS 42(a) was originally 90 GB in size, since the two earliest snapshots, in SFS 44(a)(1) and SFS 44(a)(2) are only 90 GB in size, but, at some point after the creation of the second snapshot, PFS 42(a) was expanded to 100 GB by updating size field 78 for PFS 42(a) from 90 to 100 GB, and thus, the most recent snapshot, in SFS 44(a)(p) is 100 GB in size.

With reference to FIG. 6 certain modifications to an SFS 44 (including creation and deletion) involve modifying SDB 62(a). Modifying SDB 62(a) involves temporarily locking the SDB 62(a). However, since the SDB 62(a) only has entries for snapshots of one particular PFS 42(a), locking SDB 62(a) does not hinder the system from making changes to snapshots for other PFSs 42, which involve a separate SDB 62 for a respective PFS 42.

Figure 7:
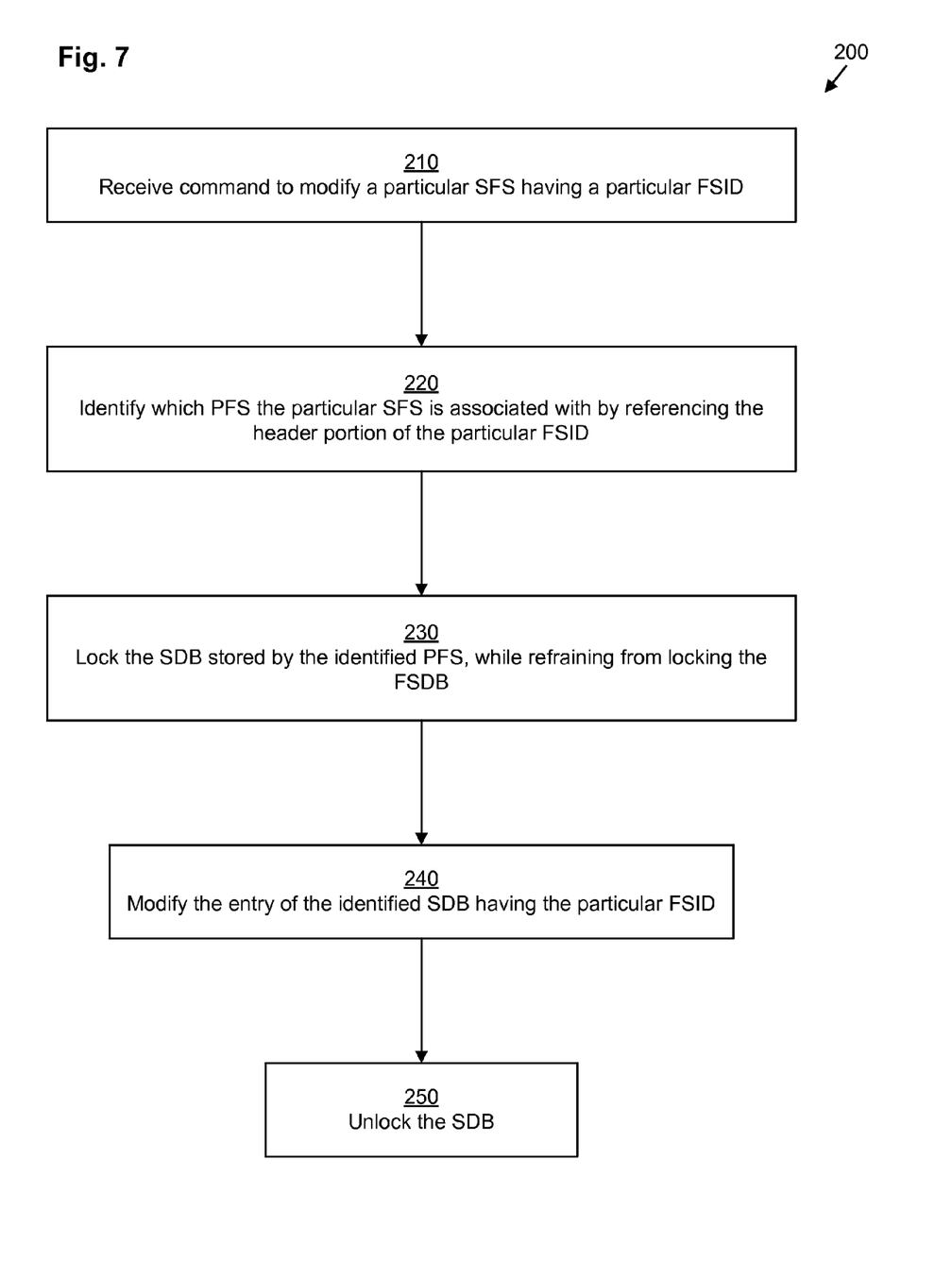
FIG. 7 is a flow chart depicting another example method according to various embodiments.

FIG. 7 illustrates, as method 200, the operation of mounting management program 64 when an SFS 44 is created or deleted. In some embodiments, if other changes to an SFS 44 are permitted (e.g., expansion or reduction), these changes may also trigger method 200.

In step 210, mounting management program 64 receives a command to modify a particular SFS 44(y) having a particular FSID. Relevant modification events include the creation or deletion (and, in some embodiments, the expansion or reduction) of an SFS 44. Thus, a snapshot management program may send a command to the mounting management program 64 instructing it to add a new SFS 44(a)(p+1) having FSID A13B F93D 0001 0101.

In step 220, mounting management program 64 identifies which PFS 42 (or, in some embodiments, which container filesystem contains that PFS 42) the SFS 44 (e.g., SFS 44(a)(p+1)) is associated with by referencing the header portion 96 of the FSID. In the example, since the header portion 96 is 0001, the mounting management program 64 is able to identify PFS 42(a) as the relevant PFS.

In step 230, mounting management program 64 locks the SDB 62 stored by the identified PFS 42 or container filesystem (e.g., SDB 62(a)), refraining from needing to lock the FSDB 60.

In step 240, while the appropriate the SDB 62 is locked, mounting management program 64 modifies (i.e, by adding or deleting) the appropriate entry of the SDB 62. In the example, mounting management program 64 adds an entry at the end of SDB 62(a) with a value in the FSID column 88 equal to A13B F93D 0001 0101, a value in the size column 90 equal to 100 GB, and a value in the mount point column 92 equal to /mnt/Vol-a/.ckpt/Snap-0101.

Thus, techniques have been described for keeping only the most commonly-accessed SFSs 44 mounted at any given time, while providing for fast mounting of unmounted snapshots. Techniques are also provided for maintaining separate databases SDB 62(*x*) for the snapshots of each PFS in order to minimize locking latency.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as methods, other embodiments include computer program products embodying these methods One such embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer or other computerized apparatus, which is programmed with instructions, which, when executed on one or more processors of the computerized apparatus, cause the processor(s) to perform one or more of the methods described.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of dynamically mounting and unmounting a set of snapshot file systems (SFSs) stored within a data storage system, each SFS of the set of SFSs associated with a corresponding primary file system (PFS) of a set of PFSs stored within the data storage system, each SFS representing a state of its corresponding PFS at a particular prior point in time, the method comprising:
   mounting a strict subset of the set of SFSs on the data storage system, the strict subset of the set of SFSs having a number of elements not exceeding a maximum number of snapshots;
   receiving a request to access an additional SFS not within the strict subset of the set of SFSs;
   mounting the additional SFS on the data storage system, thereby adding the additional SFS to the strict subset of the set of SFSs; and
   if mounting the additional SFS on the data storage system causes the number of elements of the strict subset of the set of SFSs to exceed the maximum number of snapshots, then, in response, unmounting another SFS of the strict subset of the set of SFSs from the data storage system, thereby removing the other SFS from the strict subset of the set of SFSs;
wherein mounting the additional SFS on the data storage system includes:
   generating a new filesystem object;
   reading metadata of the additional SFS from a file stored within the PFS corresponding to the additional SFS; and
   storing the read metadata within the new filesystem object.

2. The method of claim 1, wherein:
   the PFS corresponding to the additional SFS includes a snapshot directory, the snapshot directory including a set of links, each link of the set of links referring to a different SFS representing a state of the PFS at a different particular prior point in time; and
   receiving the request to access the additional SFS includes receiving a command to access a link of the set of links, the link referring to the additional SFS.

3. The method of claim 1, wherein the maximum number of snapshots is a preconfigured value such that metadata for the maximum number of snapshots does not exceed 20% of a memory capacity of the data storage system.

4. The method of claim 1, wherein the maximum number of snapshots is a value that dynamically varies based on a data access load of the data storage system.

5. The method of claim 1, wherein unmounting the other SFS of the strict subset of the set of SFSs from the data storage system includes selecting a least-recently accessed SFS from the strict subset of the set of SFSs as the other SFS of the strict subset of the set of SFSs.

6. A method of dynamically mounting and unmounting a set of snapshot file systems (SFSs) stored within a data storage system, each SFS of the set of SFSs associated with a corresponding primary file system (PFS) of a set of PFSs stored within the data storage system, each SFS representing a state of its corresponding PFS at a particular prior point in time, the method comprising:
   mounting a strict subset of the set of SFSs on the data storage system, the strict subset of the set of SFSs having a number of elements not exceeding a maximum number of snapshots;
   receiving a request to access an additional SFS not within the strict subset of the set of SFSs;
   mounting the additional SFS on the data storage system, thereby adding the additional SFS to the strict subset of the set of SFSs; and
   if mounting the additional SFS on the data storage system causes the number of elements of the strict subset of the set of SFSs to exceed the maximum number of snapshots, then, in response, unmounting another SFS of the strict subset of the set of SFSs from the data storage system, thereby removing the other SFS from the strict subset of the set of SFSs;
   wherein the data storage system stores a filesystem database (FSDB), the FSDB including one entry for each PFS of the set of PFSs, each entry including a unique filesystem identification number (FSID), each FSID including a header portion and a footer portion, the footer portion including a particular set of digits indicating that that FSID represents a PFS rather than an SFS, the header portion uniquely identifying a PFS associated with that FSID, each entry also storing a size of that PFS and a mount point for that PFS.

7. The method of claim 6, wherein:
   each PFS stores a local snapshot database (SDB), the SDB including one entry for each SFS associated with that PFS, each entry including a unique FSID including a header portion and a footer portion, the header portion uniquely identifying that PFS, the footer portion uniquely identifying that SFS, each entry also storing a size of that SFS and a mount point for that SFS; and
   the method further comprises:
      receiving a command to modify a particular SFS having a particular FSID;

identifying which PFS the particular SFS is associated with by referencing the header portion of the particular FSID;
locking the SDB stored by the identified PFS, while refraining from locking the FSDB;
modifying the entry of the identified SDB having the particular FSID; and
after modifying the entry, unlocking the SDB.

8. An apparatus, comprising:
a set of data storage devices storing:
a set of primary file systems (PFSs); and
a set of snapshot file systems (SFSs), each SFS of the set of SFSs associated with a corresponding PFS of the set of PFSs, each SFS representing a state of its corresponding PFS at a particular prior point in time;
a network interface;
a processor; and
memory, the memory storing a set of instructions, which, when performed by the processor, causes the processor to perform the operations of:
mounting a strict subset of the set of SFSs into memory, the strict subset of the set of SFSs having a number of elements not exceeding a maximum number of snapshots;
receiving, via the network interface, a request to access an additional SFS not within the strict subset of the set of SFSs;
mounting the additional SFS into memory, thereby adding the additional SFS to the strict subset of the set of SFSs; and
if mounting the additional SFS into memory causes the number of elements of the strict subset of the set of SFSs to exceed the maximum number of snapshots, then, in response, unmounting from memory another SFS of the strict subset of the set of SFSs, thereby removing the other SFS from the strict subset of the set of SFSs;
wherein the operation of mounting the additional SFS into memory includes:
generating a new filesystem object within memory;
reading metadata of the additional SFS from a file stored within the PFS corresponding to the additional SFS; and
storing the read metadata within the new filesystem object.

9. The apparatus of claim 8, wherein:
the PFS corresponding to the additional SFS includes a snapshot directory, the snapshot directory including a set of links, each link of the set of links referring to a different SFS representing a state of the PFS at a different particular prior point in time; and
the operation of receiving the request to access the additional SFS includes receiving a command to access a link of the set of links, the link referring to the additional SFS.

10. The apparatus of claim 8, wherein:
the memory has a memory capacity;
the maximum number of snapshots is a preconfigured value such that metadata for the maximum number of snapshots does not exceed 20% of the memory capacity of the memory.

11. The apparatus of claim 8, wherein the maximum number of snapshots is a value that dynamically varies based on a data access load of the data storage system.

12. An apparatus, comprising:
a set of data storage devices storing:
a set of primary file systems (PFSs); and
a set of snapshot file systems (SFSs), each SFS of the set of SFSs associated with a corresponding PFS of the set of PFSs, each SFS representing a state of its corresponding PFS at a particular prior point in time;
a network interface;
a processor; and
memory, the memory storing a set of instructions, which, when performed by the processor, causes the processor to perform the operations of:
mounting a strict subset of the set of SFSs into memory, the strict subset of the set of SFSs having a number of elements not exceeding a maximum number of snapshots;
receiving, via the network interface, a request to access an additional SFS not within the strict subset of the set of SFSs;
mounting the additional SFS into memory, thereby adding the additional SFS to the strict subset of the set of SFSs; and
if mounting the additional SFS into memory causes the number of elements of the strict subset of the set of SFSs to exceed the maximum number of snapshots, then, in response, unmounting from memory another SFS of the strict subset of the set of SFSs, thereby removing the other SFS from the strict subset of the set of SFSs;
wherein the set of data storage devices stores a central filesystem database (FSDB), the FSDB including one entry for each PFS of the set of PFSs, each entry including a unique filesystem identification number (FSID), each FSID including a header portion and a footer portion, the footer portion including a particular set of digits indicating that that FSID represents a PFS rather than an SFS, the header portion uniquely identifying a PFS associated with that FSID, each entry also storing a size of that PFS and a mount point for that PFS.

13. The apparatus of claim 12, wherein:
each PFS stores a local snapshot database (SDB), the SDB including one entry for each SFS associated with that PFS, each entry including a unique FSID including a header portion and a footer portion, the header portion uniquely identifying that PFS, the footer portion uniquely identifying that SFS, each entry also storing a size of that SFS and a mount point for that SFS; and
the memory further stores a set of instructions, which, when performed by the processor, causes the processor to perform the operations of:
receiving a command to modify a particular SFS having a particular FSID;
identifying which PFS the particular SFS is associated with by referencing the header portion of the particular FSID;
locking the SDB stored by the identified PFS, while refraining from locking the FSDB;
modifying the entry of the identified SDB having the particular FSID; and
after modifying the entry, unlocking the SDB.

14. A computer program product comprising a non-transitory computer-readable medium storing instructions, which, when performed by a computing device cause the computing device to dynamically mount and unmount a set of snapshot file systems (SFSs) stored within a data storage system, each SFS of the set of SFSs associated with a corresponding primary file system (PFS) of a set of PFSs stored within the data storage system, each SFS representing a state of its corresponding PFS at a particular prior point in time, by performing the following operations:

mounting a strict subset of the set of SFSs on the data storage system, the strict subset of the set of SFSs having a number of elements not exceeding a maximum number of snapshots;

receiving a request to access an additional SFS not within the strict subset of the set of SFSs;

mounting the additional SFS on the data storage system, thereby adding the additional SFS to the strict subset of the set of SFSs; and     if mounting the additional SFS on the data storage system causes the number of elements of the strict subset of the set of SFSs to exceed the maximum number of snapshots, then, in response, unmounting another SFS of the strict subset of the set of SFSs from the data storage system, thereby removing the other SFS from the strict subset of the set of SFSs;

wherein the operation of mounting the additional SFS on the data storage system includes:

generating a new filesystem object;

reading metadata of the additional SFS from a file stored within the PFS corresponding to the additional SFS; and     storing the read metadata within the new filesystem object.

* * * * *